United States Patent
Kanai

(10) Patent No.: US 9,092,322 B2
(45) Date of Patent: Jul. 28, 2015

(54) PROCESSOR SYSTEM AND CONTROL METHOD THEREOF

(75) Inventor: Tomoaki Kanai, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 119 days.

(21) Appl. No.: 14/007,514

(22) PCT Filed: Feb. 24, 2012

(86) PCT No.: PCT/JP2012/001284
§ 371 (c)(1),
(2), (4) Date: Sep. 25, 2013

(87) PCT Pub. No.: WO2012/132218
PCT Pub. Date: Apr. 10, 2012

(65) Prior Publication Data
US 2014/0025871 A1   Jan. 23, 2014

(30) Foreign Application Priority Data
Mar. 31, 2011   (JP) ................. 2011-080479

(51) Int. Cl.
| G06F 12/00 | (2006.01) |
| G06F 12/02 | (2006.01) |
| G06F 12/14 | (2006.01) |
| G06F 21/00 | (2013.01) |

(52) U.S. Cl.
CPC ........ G06F 12/0246 (2013.01); G06F 12/1425 (2013.01)

(58) Field of Classification Search
CPC .................................. G06F 12/14; G06F 21/70
USPC ................................. 726/26; 711/163; 710/36
See application file for complete search history.

(56) References Cited

U.S. PATENT DOCUMENTS

| 4,581,702 | A | * | 4/1986 | Saroka et al. ................. 711/207 |
| 5,668,945 | A | * | 9/1997 | Ohba et al. ..................... 726/30 |
| 7,054,990 | B1 | | 5/2006 | Tamura et al. |
| 7,512,759 | B2 | * | 3/2009 | Nakanishi et al. ............ 711/163 |

(Continued)

FOREIGN PATENT DOCUMENTS

| JP | 2001-051904 A | 2/2001 |
| JP | 2004-259385 A | 9/2004 |

(Continued)

OTHER PUBLICATIONS

International Search Report received in PCT/JP20012/001284 dated Mar. 19, 2012.

*Primary Examiner* — Christopher Shin
(74) *Attorney, Agent, or Firm* — Foley Lardner LLP

(57) ABSTRACT

A processor system according to the present invention includes a storage unit, a control information area that stores an access prohibit flag capable of switching from an allow side to a prohibit side, a main PEa that issues an access request to the storage unit and a request for rewriting a copy register, a security PE that evaluates whether or not the request for rewriting the copy register is valid, the copy register that stores, when the access prohibit flag is set to the allow side, a value corresponding to the allowance and, when the access prohibit flag is set to the prohibit side, a value corresponding to an evaluation result by the security PE, and an access control circuit that controls whether or not to allow access from the main PEa to the storage unit based on an output value from the copy register.

14 Claims, 11 Drawing Sheets

(56) References Cited

U.S. PATENT DOCUMENTS

| | | | |
|---|---|---|---|
| 8,001,390 B2 * | 8/2011 | Hatakeyama | 713/190 |
| 8,060,925 B2 * | 11/2011 | Yoshii et al. | 726/11 |
| 8,474,032 B2 * | 6/2013 | Fetik | 726/11 |
| 2004/0179401 A1 | 9/2004 | Nakata | |
| 2006/0242425 A1 | 10/2006 | Ishida | |
| 2006/0285398 A1 | 12/2006 | Kurosawa | |
| 2007/0050852 A1 | 3/2007 | Yoshii et al. | |
| 2008/0313471 A1 * | 12/2008 | Huang et al. | 713/185 |
| 2011/0205794 A1 | 8/2011 | Tanaka et al. | |

FOREIGN PATENT DOCUMENTS

| | | |
|---|---|---|
| JP | 2005-108273 A | 4/2005 |
| JP | 2006-302416 A | 11/2006 |
| JP | 2006-350885 A | 12/2006 |
| JP | 2007-066201 A | 3/2007 |

* cited by examiner

PROCESSOR SYSTEM AND CONTROL METHOD THEREOF

This application is the National Phase of PCT/JP2012/001284, filed Feb. 24, 2012, which claims priority to Japanese Application No. 2011-080479, filed Mar. 31, 2011. the disclosures of which are hereby incorporated by reference in their entirety.

TECHNICAL FIELD

The present invention relates to a processor system and a control method thereof, and particularly to a processor system including a semiconductor storage circuit that can be access controlled and a control method thereof.

BACKGROUND ART

Patent literature 1 discloses a non-volatile semiconductor storage device including a protection function from a data write or erase. FIG. 9 is a block diagram showing the non-volatile semiconductor storage device disclosed in patent literature 1. As shown in FIG. 9, this non-volatile semiconductor storage device includes a memory cell array 1 composed of a plurality of memory blocks, interfaces 6 and 7, write circuits 2, 3, 4, 5, and 8 and read circuits 2, 3, 4, 5, and 8. A protect flag is written in the above-mentioned memory block. The above circuit is characterized in that in response to a write command input from the above interface, the write circuit executes the write command when the protect flag has a first value and does not execute the write command when the protect flag has a second value.

Patent literature 2 discloses a processor that attempts to prevent unauthorized actions such as unauthorized access to a computer at low cost. The processor disclosed in patent literature 2 includes: processor side memory authentication information holding means configured integrally with a computing means for holding first memory authentication information and second memory authentication information; memory authentication means for comparing first memory authentication information obtained from a first memory and the first memory authentication information held by the processor side memory authentication information holding means to authenticate the first memory and comparing second memory authentication information obtained from a second memory and the second memory authentication information held by the processor side memory authentication information holding means to authenticate the second memory; and access control means for controlling access to the first memory and the second memory based on authentication results by the memory authentication means.

CITATION LIST

Patent Literature

Patent literature 1: Japanese Unexamined Patent Application Publication No. 2005-108273
Patent literature 2: Japanese Unexamined Patent Application Publication No. 2007-066201

SUMMARY OF INVENTION

Technical Problem

The non-volatile semiconductor storage device (semiconductor storage circuit) disclosed in patent literature 1 determines whether or not to allow a data write and erase depending on a value of the protect flag. However, patent literature 1 does not disclose how to control allowance or prohibition on rewriting the protect flag itself. Therefore, there has been a problem in which after the protect flag that has been set to a prohibit side is rewritten to an allow side, a malicious third party may rewrite or erase stored data.

As a solution to such a problem, the present inventor examined a logical configuration of hardware responsible for writing the protect flag in such a manner that the protect flag can never return to the allow side once set to the prohibit side.

However, with this configuration, once the protect flag is set to the prohibit side, it becomes impossible, not only for the malicious third party, to write or erase data in a non-volatile semiconductor storage device. For example, once the manufacturer sets the protect flag to the prohibit side in order to prevent a data write or erase by the malicious third party, the manufacturer itself will be unable to write or erase data after that. Therefor it becomes impossible to update a program stored to the non-volatile semiconductor storage device that is already available in the market. Accordingly, with the configuration in which the protect flag can never return to the allow side once the protect flag is set to the prohibit side, an advantage of the non-volatile semiconductor storage device is lost, which is rewritable property.

As described above, in the related arts, there has been a problem that once the protect flag indicates the prohibition of the access to the semiconductor storage circuit, the access to the semiconductor storage circuit cannot be flexibly controlled after that.

Solution to Problem

A processor system according to the present invention includes a first storage unit that is composed of a plurality of electrically rewritable non-volatile memory cells, a second storage unit that stores an access prohibit flag that is capable of switching value from a first value to a second value, a first processor that issues an access request to the first storage unit and authentication information corresponding to the access request, a second processor that evaluates whether or not the authentication information issued from the first processor is valid, a copy register that stores a value corresponding to the first value when a value of the access prohibit flag is the first value and stores a value corresponding to an evaluation result by the second processor when the value of the access prohibit flag is the second value, and an access control circuit that controls whether or not to allow access from the first processor to the first storage unit based on the value stored to the copy register.

Further, a method of controlling a processor system according to the present invention includes issuing, from a first processor, an access request to a first storage unit and authentication information corresponding to the access request, evaluating, by a second processor, whether or not the authentication information issued from the first processor is valid, storing, when a value of an access prohibit flag is a first value, a value corresponding to a first value to a copy register, in which the access prohibit flag is capable of switching value from the first value to a second value, storing, when the value of the access prohibit flag is the second value, a value corresponding to an evaluation result by the second processor to the copy register, and controlling whether or not to allow access from the first processor to the first storage unit based on the value stored to the copy register.

The circuit configuration and the control method as above enable flexible control on access to a semiconductor storage circuit even after a protect flag indicates the prohibition of the access to the semiconductor storage circuit.

Advantageous Effects of Invention

The present invention can provide a processor system and a control method thereof that are capable of flexibly controlling the access to the semiconductor storage circuit even after the protect flag indicates the prohibition of the access to the semiconductor storage circuit.

DESCRIPTION OF EMBODIMENTS

Prior to detailed explanation of the embodiments of the present invention, an overview of a processor system (information processing apparatus) to which the present invention is applied is explained. Note that although the present invention is applied to the processor system explained below, the processor system to be explained is an example and the present invention can be applied to other processor system.

Figure 1:
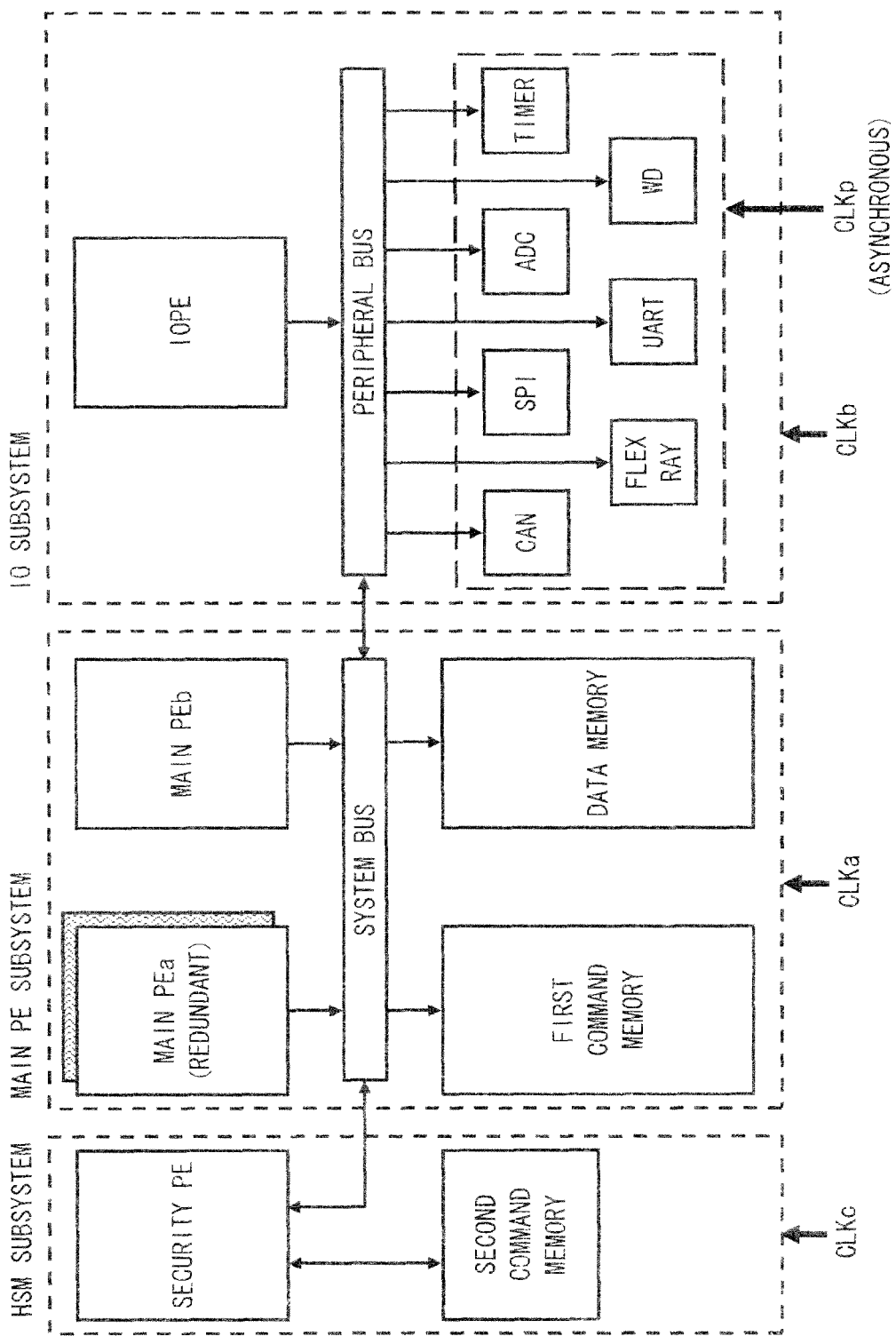
FIG. 1 is a schematic diagram of a processor system to which the present invention is applied.

FIG. 1 shows a schematic diagram of the processor system to which the present invention is applied. As shown in FIG. 1, the processor system according to the present invention realizes improvement in processing performance using a plurality of PEs (Processing Elements). Moreover, in the processor system according to the present invention, the functions are categorized into three subsystems other than the categorization of PE functional blocks. As shown in FIG. 1, the processor system according to the present invention has a main PE (Processing Element) subsystem, an IO (Input Output) subsystem, and an HSM (Hardware Security Module) subsystem.

The main PE subsystem performs specific processing desired for the processor system based on a program that is already stored inside or a program read from outside. The IO subsystem performs various processing for peripheral devices used by the main PE subsystem or the HSM subsystem to operate. The HSM subsystem performs security check processing of the processing performed by the processor system. Moreover, in the processor system according to the present invention, clock signals CLKa, CLKb, CLKc, and CLKp are supplied to each subsystem. In the example shown in FIG. 1, the clock signal CLKa is supplied to the main PE subsystem, the clock signals CLKb and CLKp are supplied to the IO subsystem, and the clock signal CLKc is supplied to the HSM subsystem. These clock signals CLKa, CLKb, and CLKc may either have the same frequency or different frequencies depending on the specification of the entire system configuration. Further, the clock signal CLKp is supplied to the peripheral devices end asynchronous with the clock signal CLKb that supplied to the IO subsystem.

Next, each subsystem is explained in more detail. The main PE subsystem includes a main PEa (first processor), a main PEb, a first command memory (semiconductor storage circuit), a data memory, and a system bus. In the main PE subsystem, the main PEa, the main PEb, the command memory, and the data memory are connected to each other through the system bus. The first command memory stores a program. The data memory temporarily stores a program read from outside and data processed in the processor system. The main PEa and main PEb both execute the program using the command memory, the data memory and the like. Note that the main PEa is configured to be capable of executing redundant operations. The redundant operation indicates an operation that operates as one processor element as software but as hardware, performs a highly reliable operation by a multiplexed configuration or a configuration including a testing circuit. As an example of the redundant operation, there is a lockstep operation that compares whether or not output results from circuits multiplexed for each clock are the same.

The IO subsystem includes a peripheral bus, an IOPE, and peripheral devices. The IOPE performs necessary processing to use the peripheral devices. Note that the IOPE may operate based on the program stored to the first command memory of the main PE system or based on the program stored to other memory area. The peripheral bus connects between the IOPE and the peripheral devices.

As the peripheral devices, FIG. 1 illustrates a CAN unit, a FLEXRAY unit, an SPI unit, a UART unit, an ADC unit, a WD unit, and a timer. The CAN unit performs communication compliant with CAN (Controller Area Network), which is one of in-vehicle communication standards for automobiles. The FLEXRAY unit performs communication compliant with Flex Ray standard, which is one of in-vehicle communication standards for automobiles. The SPI unit performs communication compliant with SPI (System Packet Interface) standard, which is three or four-wire serial communication. The UART (Universal Asynchronous Receiver Transmitter) unit, in the asynchronous communication method, converts a serial signal into a parallel signal and also converts a parallel signal into a serial signal. The ADC (Analog to Digital Converter) unit converts an analog signal supplied from a sensor and the like into a digital signal. The WD (Watch Dog) unit offers a watchdog timer function that detects that a predetermined period has elapsed. The timer measures the time, generates waveforms and the like. In the example of FIG. 1, the above units are explained as the peripheral devices, however a unit including other function or only a part of the units can be included.

The HSM subsystem includes a security PE (second processor) and a second command memory. The security PE is connected to the system bus. The security PE evaluates validity at the program executed by the main PE subsystem or validity of the data obtained by executing the program. The second command memory stores the program. Moreover, the second command memory is accessible only to the security PE. Although the second command memory can be provided as one storage area together with the first command memory, the second command memory needs to be access controlled as an area accessible only to the security PE.

As described above, the processor system to which the present invention is applied realizes high resistance to an unexpected failure and a malfunction such as an unexpected program change while improving processing performance by the plurality of PEs. Note that the processor system explained so far is an example of the processor system to which the present invention is applied, and there can be variations in, for example, the arrangement of the command memory and data memory and the number of the command memories and data memories in the system depending on the architecture of the system. Further, there can be various configurations for the connection between the memory and the processor elements depending on the design of the architecture, for example the memory and the processor elements may be connected through a plurality of buses or the memory may be connected to the processor elements without bus.

The above explanation is for the entire configuration of the processor system to which the present invention is applied. However, the components not explained in the explanation of the above-mentioned processor system shall be added as appropriate in the description of the embodiments according to the present invention. Additional components shall be explained as well.

Hereinafter, embodiments of the present invention are explained with reference to the drawings. Note that the drawings are simplified, and the technical scope of the present invention shall not be interpreted in a narrow sense based on the description of the drawings. The same components are denoted by the same reference numerals, and repeated explanation shall not be provided.

First Embodiment

Figure 2:
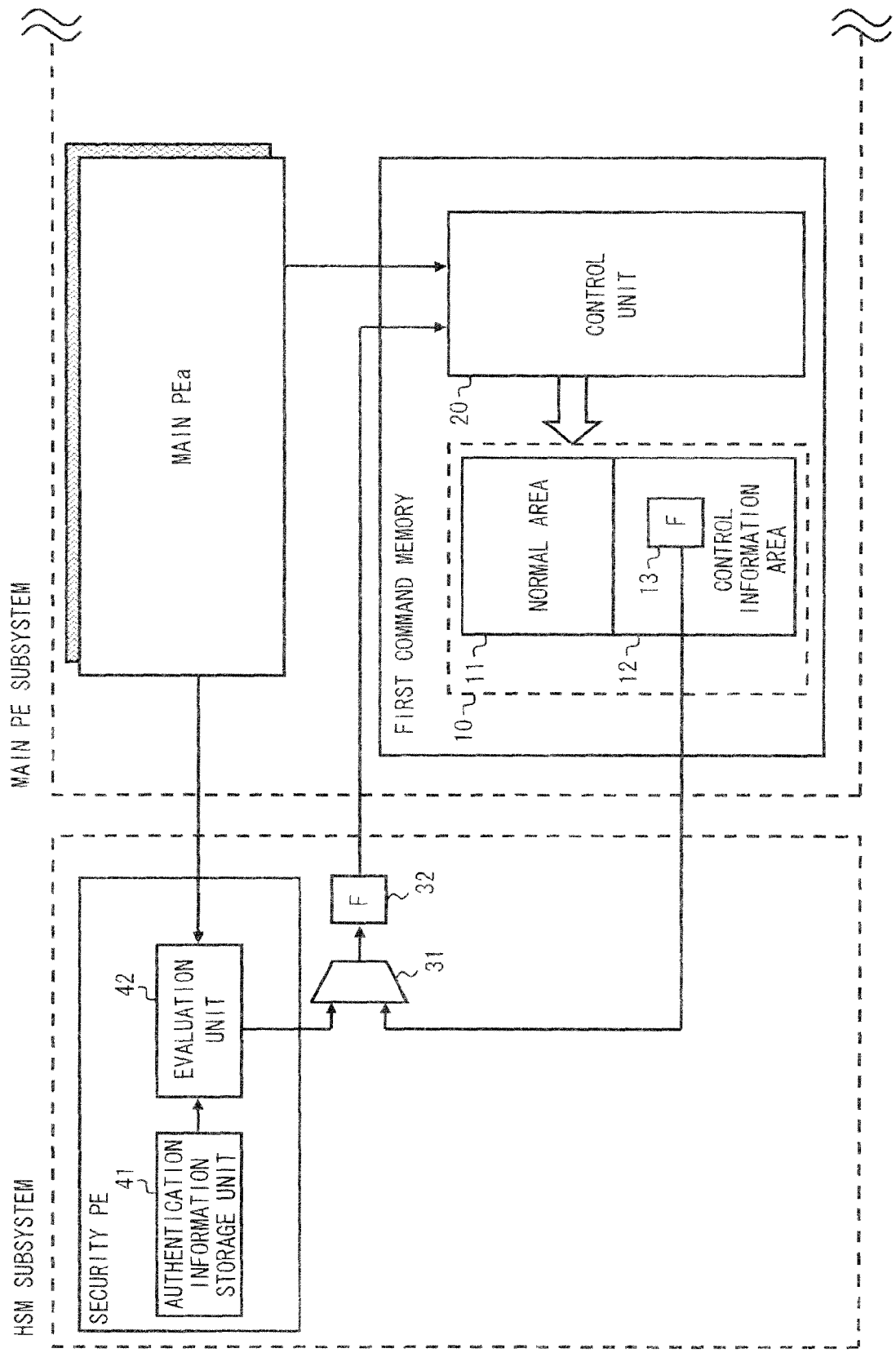
FIG. 2 is a block diagram showing a part of the processor system according to a first embodiment of the present invention.

FIG. 2 is a block diagram showing a specific configuration example of the processor system according to the first embodiment of the present invention. The processor system according to this embodiment is characterized in that the processor system can flexibly control access to a storage unit 10 even after an access prohibit flag (protect flag) indicates the prohibition of access to the storage unit 10. Detailed explanation shall be provided below.

In the processor system shown in FIG. 2, the first command memory includes the storage unit (first storage unit) 10 and a control unit 20. The first command memory is composed of a plurality of electrically rewritable non-volatile memory cells. Therefore, even when power supply is suspended, data stored to the first command memory is not erased but held. As the non-volatile semiconductor memory, there are an EEPROM and a flash memory, for example.

(Storage Unit 10)

The storage unit 10 includes a normal area 11 that stores a program and a control information area (second storage unit) 12 that stores an access prohibit flag 13. Note that this embodiment explains the case as an example in which the normal area 11 and the control information area 12 are configured as one semiconductor memory, however it is not limited to this. The normal area 11 and the control information area 12 may be configured in different semiconductor memories physically. For example, one of the normal area 11 and the control information area 12 may be provided in the first command memory and the remaining one of the normal area 11 and the control information area 12 may be provided in a memory different from the first command memory.

The control information area 12 stores the access prohibit flag 13 that is configured to specify whether to allow or prohibit writing, reading, and erasing the program in the storage unit 10. When the access prohibit flag 13 is set to a prohibit side, writing, reading, and erasing the program in the storage unit 10 is prohibited. On the other hand, when the access prohibit flag 13 is set to an allow side, writing, reading, and erasing the program in the storage unit 10 is allowed. Here, the access prohibit flag 13 is formed in the control information area 12 such that once the access prohibit flag 13 is set to the prohibit side, the access prohibit flag 13 can never return to the allow side. Hereinafter, the case is explained as an example in which when the access prohibit flag 13 is an L level (second value), the access prohibit flag is set to the prohibit side, whereas when the access prohibit flag 13 is an H level (first value), the access prohibit flag 13 is set to the allow side.

(Control Unit 20)

Figure 3A:
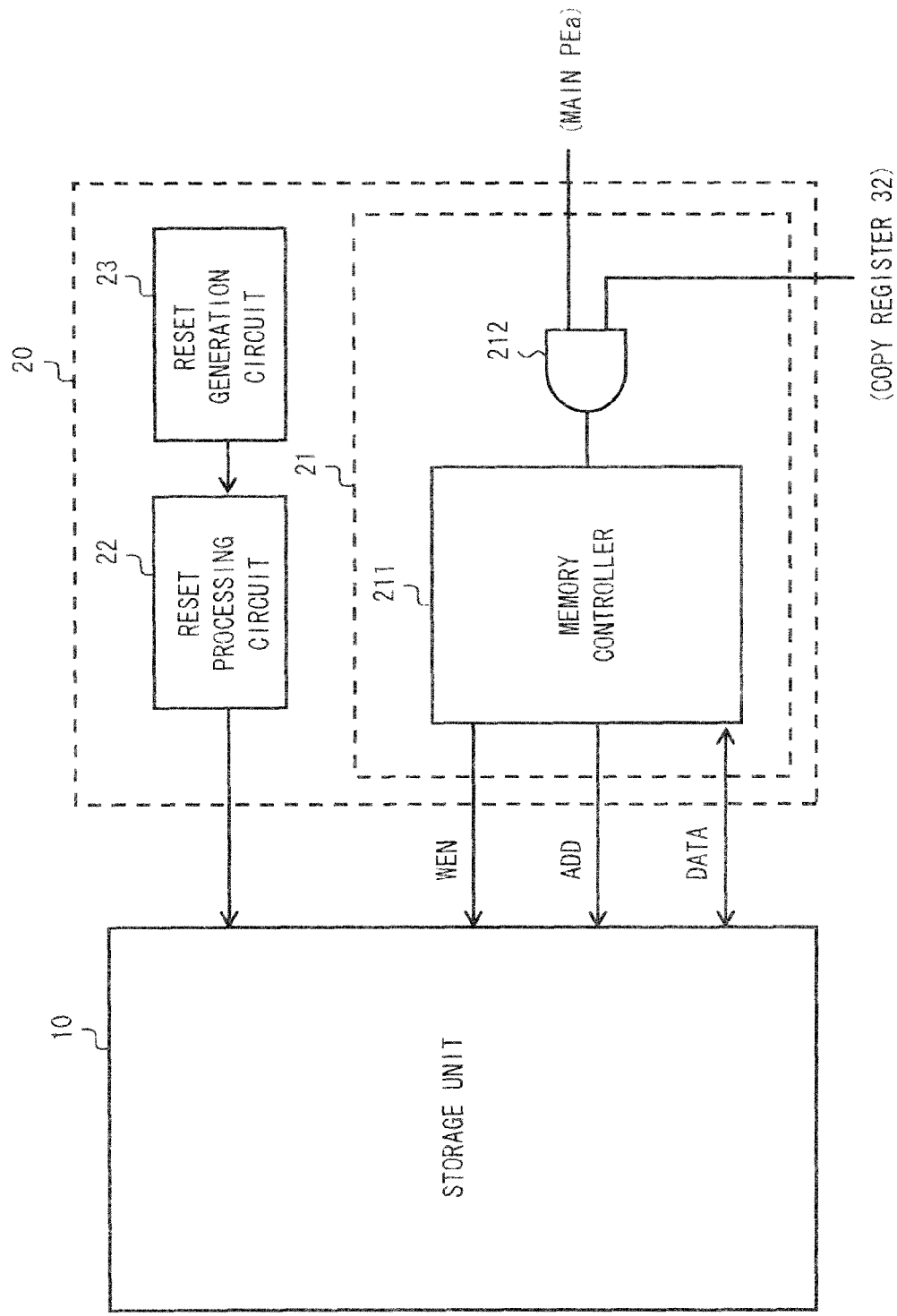
FIG. 3A is a block diagram showing a control unit according to the first embodiment of the present invention.

FIG. 3A is a block diagram showing a detailed circuit configuration of the control unit 20. As shown in FIG. 3A, the control unit 20 includes an access control circuit 21, a reset processing circuit 22, and a reset generation circuit 23. The access control circuit 21 includes a memory controller 211 and a gating circuit 212. Note that this embodiment explains the case as an example in which the gating circuit 212 is an AND circuit provided for each bit.

Upon receipt of a request for writing, reading, or erasing the program in the storage unit 10 that is issued from the main PEa (first processor), the access control circuit 21 controls whether or not to execute processing corresponding to the request on the storage unit 10 based on an output value from an access prohibit flag copy register 32, which is described later. Detailed explanation shall be provided below.

The gating circuit 212 controls, based on the output value from the access prohibit flag copy register 32, whether or not to output the request for writing, reading, or erasing the program in the storage unit 10 that is issued from the main PEa (first processor) to the memory controller 211.

For example, when the output value from the access prohibit flag copy register 32 is a value of the allow side (H level, for example), the gating circuit 212 outputs the access request as it is to the storage unit 10 that is issued from the main PEa to the subsequent stage memory controller 211. On the other hand, when the output value from the access prohibit flag copy register 32 is a value of the prohibit side (L level, for example), the gating circuit 212 does not output the access request to the storage unit 10 that is issued from the main PEa. In this case, the gating circuit 212 outputs a fixed signal of L level to the memory controller 211, for example.

When the output value from the access prohibit flag copy register 32 is the value of the allow side, the access request to the storage unit 10 that is issued from the main PEa is transmitted to the memory controller 211. The memory controller 211 generates a write enable signal WEN, an address signal ADD, and a data signal DATA based on the access request to the storage unit 10 that is issued from the main PEa. Note that the data signal DATA is generated upon writing and composes a part of the program.

Here, upon reading the program, the data stored to a memory cell of the normal area 11 specified by the address signal ADD is read, and upon writing the program, the data signal DATA is written to a memory cell of the normal area 11 specified by the address signal ADD. Note that writing, reading, and erasing of the program is switched by the write enable signal WEN. As mentioned above, when the output value from the access prohibit flag copy register 32 is the value of the allow side, the access control circuit 21 executes the processing corresponding to the request from the main PEa.

On the other hand, when the output value from the access prohibit flag copy register 32 is the value of the prohibit side, the access request to the storage unit 10 issued from the main PEa is not transmitted to the memory controller 211. Therefore, the memory controller 211 does not execute the processing corresponding to the access request to the storage unit 10 that is issued from the main PEa. As described above, when the output value from the access prohibit flag copy register 32 is the value of the prohibit side, the access control circuit 21 does not execute the processing corresponding to the request from the main PEa.

Note that although this embodiment explains the case as an example in which the memory controller 211 outputs the write enable signal WEN, the address signal ADD, and the data signal DATA, it is not limited to this. The memory controller 211 can be appropriately changed to a circuit configuration that outputs a signal corresponding to the specification of the storage unit 10. For example, the memory controller 211 can be appropriately changed to a circuit configuration that further outputs other signal such as a chip enable signal CEN.

Moreover, the access control circuit 21 is not limited to the configuration shown in FIG. 3A. For example, the access control circuit 21 can be appropriately changed to a configuration shown in FIG. 3B. The configuration and an operation of the access control circuit 21 shown in FIG. 3B are explained below.

Figure 3B:
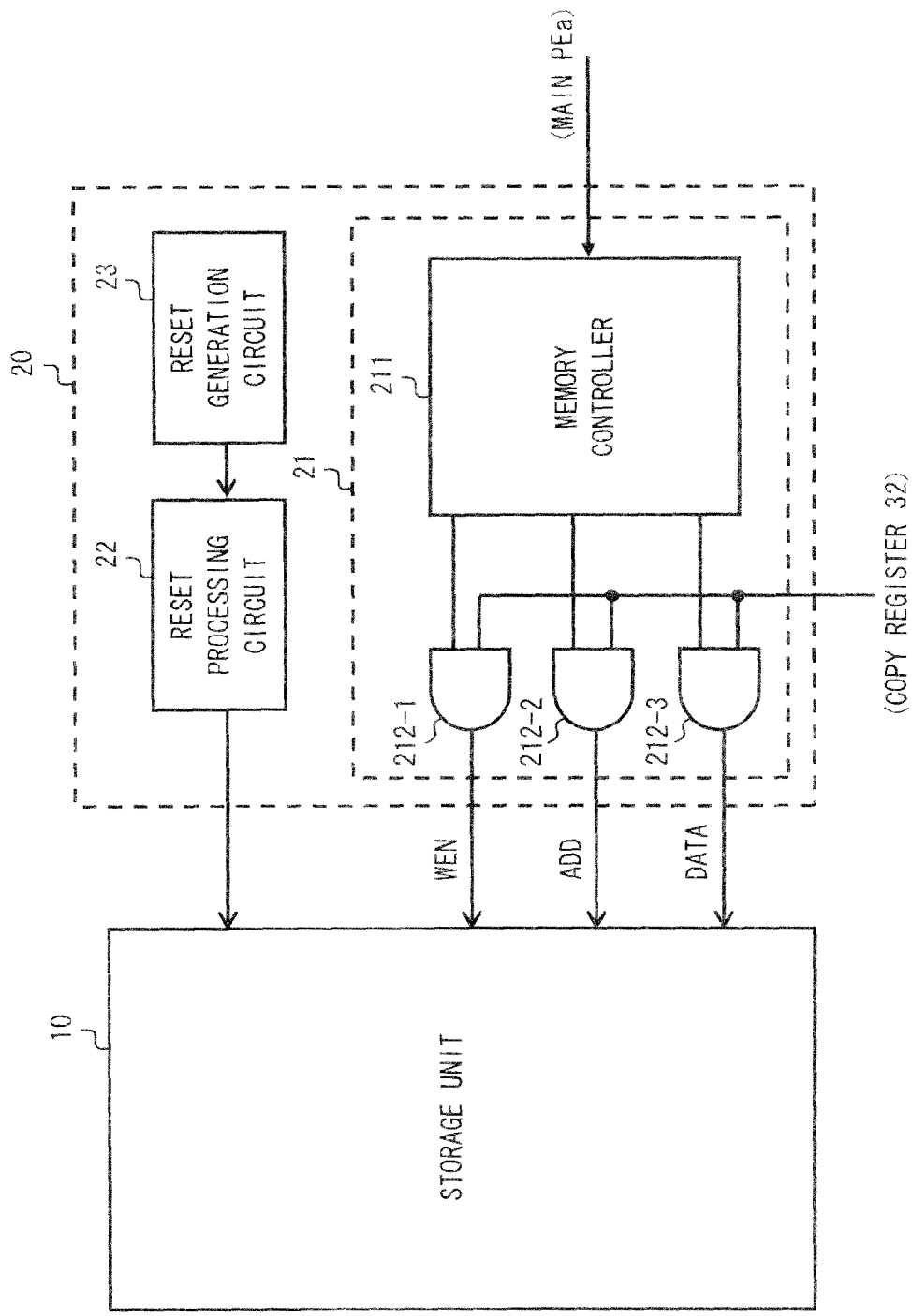
FIG. 3B is a block diagram showing the control unit according to the first embodiment of the present invention.

In FIG. 3B, the access control circuit 21 includes the memory controller 211 and the gating circuits 212-1 to 212-3. This embodiment explains the case as an example in which the gating circuits 212-1 to 212-3 are AND circuits provided for each bit.

Upon receipt of the request for writing, reading, or erasing the program in the storage unit 10 that is issued from the main PEa (first processor), the access control circuit 21 controls whether or not to execute the processing corresponding to the request based on the output value from the access prohibit flag copy register 32, which is described later.

More specifically, in the access control circuit 21, the memory controller 211 generates the write enable signal WEN, the address signal ADD, and the data signal DATA based on the request for writing, reading, or erasing the program in the storage unit 10 that is issued from the main PEa. Note that the data signal DATA is generated at the time of writing and composes a part of the program. The gating circuits 212-1 to 212-3 control whether or not to output the write enable signal WEN, the address signal ADD, and the data signal DATA that are generated by the memory controller 211 based on the output value from the access prohibit flag copy register 32.

For example, when the output value from the access prohibit flag copy register 32 is the value of the allow side (H level, for example), the gating circuits 212-1 to 212-3 output the write enable signal WEN, the address signal ADD, and the data signal DATA from the memory controller 211 as they are to the storage unit 10. He upon reading the program, the data stored to the memory cell of the normal area 11 specified by the address signal ADD is read, and upon writing the program, the data signal DATA is written to the memory cell of the normal area 11 specified by the address signal ADD. Note that writing, reading, and erasing of the program is switched by the write enable signal WEN. As mentioned above, when the output value from the access prohibit flag copy register 32 is the value of the allow side, the access control circuit 21 executes the processing corresponding to the request from the main PEa.

On the other hand, when the output value from the access prohibit flag copy register 32 is the value of the prohibit side (L level, for example), the gating circuits 212-1 to 212-3 do not output the write enable signal WEN, the address signal ADD, and the data signal DATA from the memory controller 211 to the storage unit 10. In this case, all of the gating circuits 212-1 to 212-3 output a fixed signal of, for example, L level to the storage unit 10. As described so far, when the output value from the access prohibit flag copy register 32 is the L level, the access control circuit 21 does not execute the processing corresponding to the request from the main PEa.

Returning to FIG. 3A, the reset generation circuit 23 generates a reset signal RST. The reset generation circuit 23 may be configured to generate the reset signal RST based on a reset signal supplied from outside or may have a so-called power-on reset configuration that generates the reset signal RST when power is turned on. Note that this embodiment explains the case as an example in which the reset generation circuit 23 is included in the control unit 20, however it is not limited to this. For example, the reset generation circuit 23 may be provided outside the processor system shown in FIG. 1.

Upon detection that the reset signal is cancelled after initialization by the reset signal RST, the reset processing circuit 22 transfers the value of the access prohibit flag 13 to the access prohibit flag copy register 32 (not shown in FIG. 3A). Then, the value of the access prohibit flag copy register 32 is rewritten by the value of the access prohibit flag 13.

Returning to FIG. 2, the main PEa issues the "request for writing, reading, or erasing the program in the storage unit 10" to the control unit 20. Further, the main PEa issues a "request for rewriting the access prohibit flag copy register 32" to the security PE provided in the HSM subsystem. Note that the "request for rewriting the access prohibit flag copy register 32" includes authentication information.

The security PE evaluates validity of the "request for rewriting the access prohibit flag copy register 32". In other words, the security PE evaluates validity of the authentication information included in the "request for rewriting the access prohibit flag copy register 32".

The security PE includes, for example, an authentication information storage unit 41 that stores predetermined authentication information in advance and an evaluation unit 42 that compares the authentication information stored to the authentication information storage unit 41 and the authentication information included in the request from the main PEa and evaluates the validity of the request. For example, the evaluation unit 42 evaluates that the request from the main PEa is valid when the authentication information matches and evaluates that the request from the main PEa is invalid when the authentication information do not match. Note that the security PE is not limited to the configuration shown in FIG. 2. The security PE can be changed to a configuration capable of evaluating the validity of the "request for rewriting the access prohibit flag copy register 32" that is issued from the main PEa as appropriate.

Moreover, in addition to the security PE, the HSM subsystem further includes a selector circuit 31 and the access prohibit flag copy register 32. The selector circuit 31 and the access prohibit flag copy register 32 are provided as different circuits from the second command memory (not shown in FIG. 2).

Upon receipt of the "request for writing the access prohibit flag copy register 32" issued from the main PEa, the security PE firstly evaluates the validity of the request. Specifically, in the security PE, the evaluation unit 42 compares the authentication information included in the "request for rewriting the access prohibit flag copy register 32" issued from the main PEa and the authentication information stored to the authentication information storage unit 41 and evaluates whether or not the request is valid. When the evaluation unit 42 evaluates that the request is valid, the evaluation unit 42 outputs a fixed signal corresponding to the request to one input terminal of the selector circuit 31. Note that the value of the access prohibit flag 13 is input to the other input terminal of the selector circuit 31 upon cancellation of the reset signal RST.

The selector circuit 31 selectively outputs the fixed signal output from the security PE and the value of the access prohibit flag 13 after cancellation of the reset signal RST to the access prohibit flag copy register 32. More specifically, when the security PE evaluates that the "request for rewriting the access prohibit flag copy register 32" is valid, the selector circuit 31 selects and outputs the fixed signal (H level) from the security PE. Further, when the reset signal RST is cancelled, the selector circuit 31 selects and outputs the value of the access prohibit flag 13 that is stored to the control information area 12. Then, the value of the access prohibit flag copy register 32 is rewritten. That is, the value of the access prohibit flag copy register 32 is rewritten by the value of the access prohibit flag 13 upon cancellation of the reset signal RST. In other cases, the value of the access prohibit flag copy register 32 is rewritten only by the fixed signal from the security PE.

For example, when the main PEa issues the access request to the storage unit 10, at the same time, the main PEa requests the security PE to rewrite the value of the access prohibit flag copy register 32 from the prohibit side to the allow side (from L level to H level). When the security PE evaluates that the request is valid, the security PE outputs a predetermined fixed signal (H level). Then, the value of the access prohibit flag copy register 32 is rewritten from the prohibit side to the allow side (from L level to H level). Accordingly, the access control circuit 21 can execute the processing corresponding to the request from the main PEa, as described above. Note that when the access prohibit flag 13 is set to the allow side, it is obvious that the access prohibit flag copy register 32 is also set to the allow side. Therefore, regardless of whether or not the request for rewriting the access prohibit flag copy register 32 is valid, the main PEa can access the storage unit 10.

Upon completion of writing, reading, or erasing the program in the storage unit 10, the main PEa requests the security PE to rewrite the value of the access prohibit flag copy register 32 from the allow side to the prohibit side (from H level to L level). In this case, the security PE outputs the predetermined fixed signal (L level). Then, the value of the access prohibit flag copy register 32 is rewritten from the allow side to the prohibit side (from H level to L level). Accordingly, regardless of the request from the main PEa, the access control circuit 21 prohibits writing, reading, and erasing the program in the storage unit 10.

Note that even when the value of the access prohibit flag copy register 32 cannot be rewritten to the prohibit side (L level) for some reason, it is possible to rewrite the value of the access prohibit flag copy register 32 to the prohibit side (L level) by transferring the value of the access prohibition flag 13, which has already been set to the prohibit side, upon cancellation of the reset signal RST. This further ensures prohibition of the access to the storage unit 10, thereby preventing unauthorized access.

(Flowchart)

Figure 4:
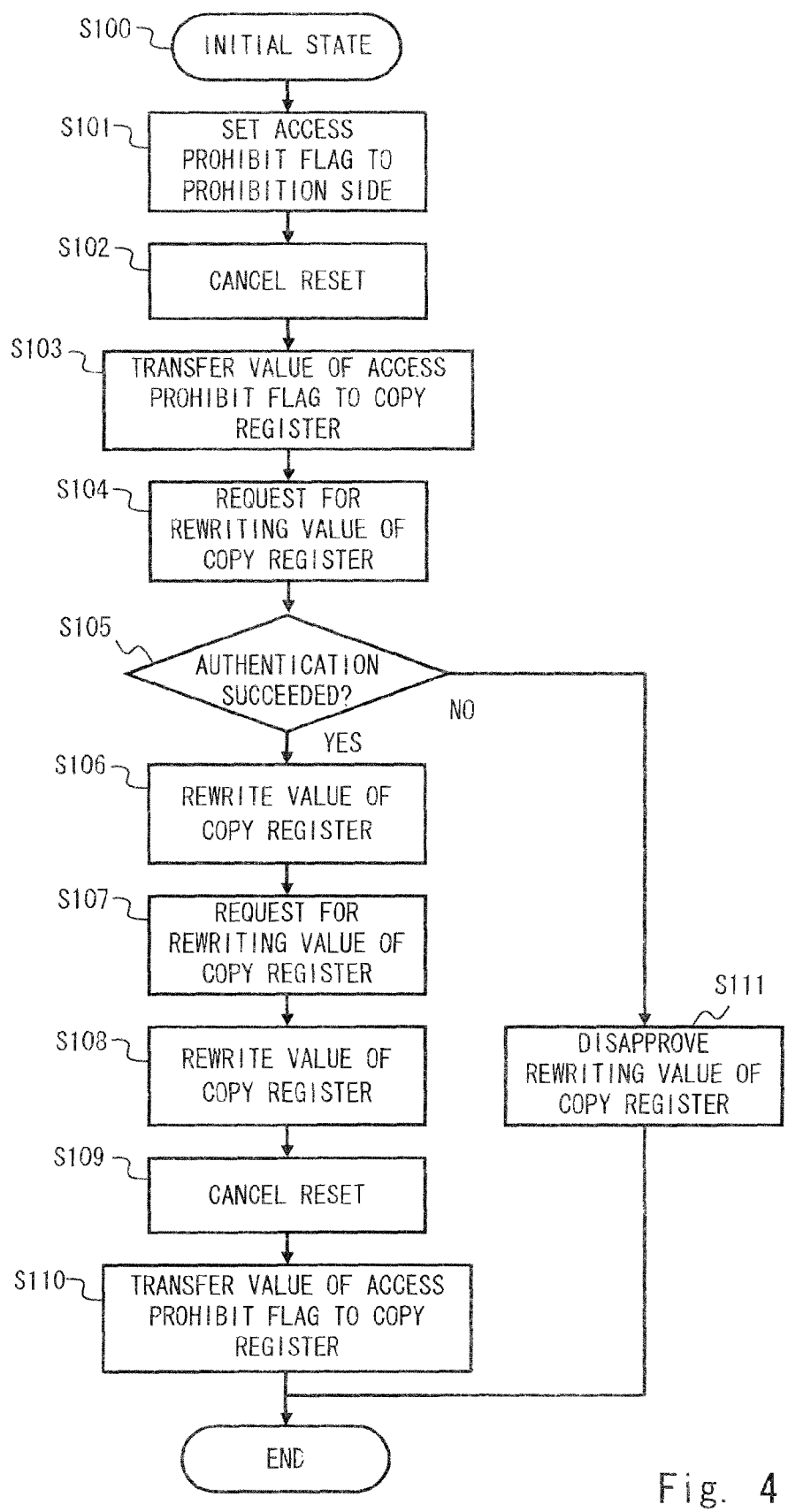
FIG. 4 is a flowchart showing an operation of the processor system according to the first embodiment of the present invention.
Figure 5:
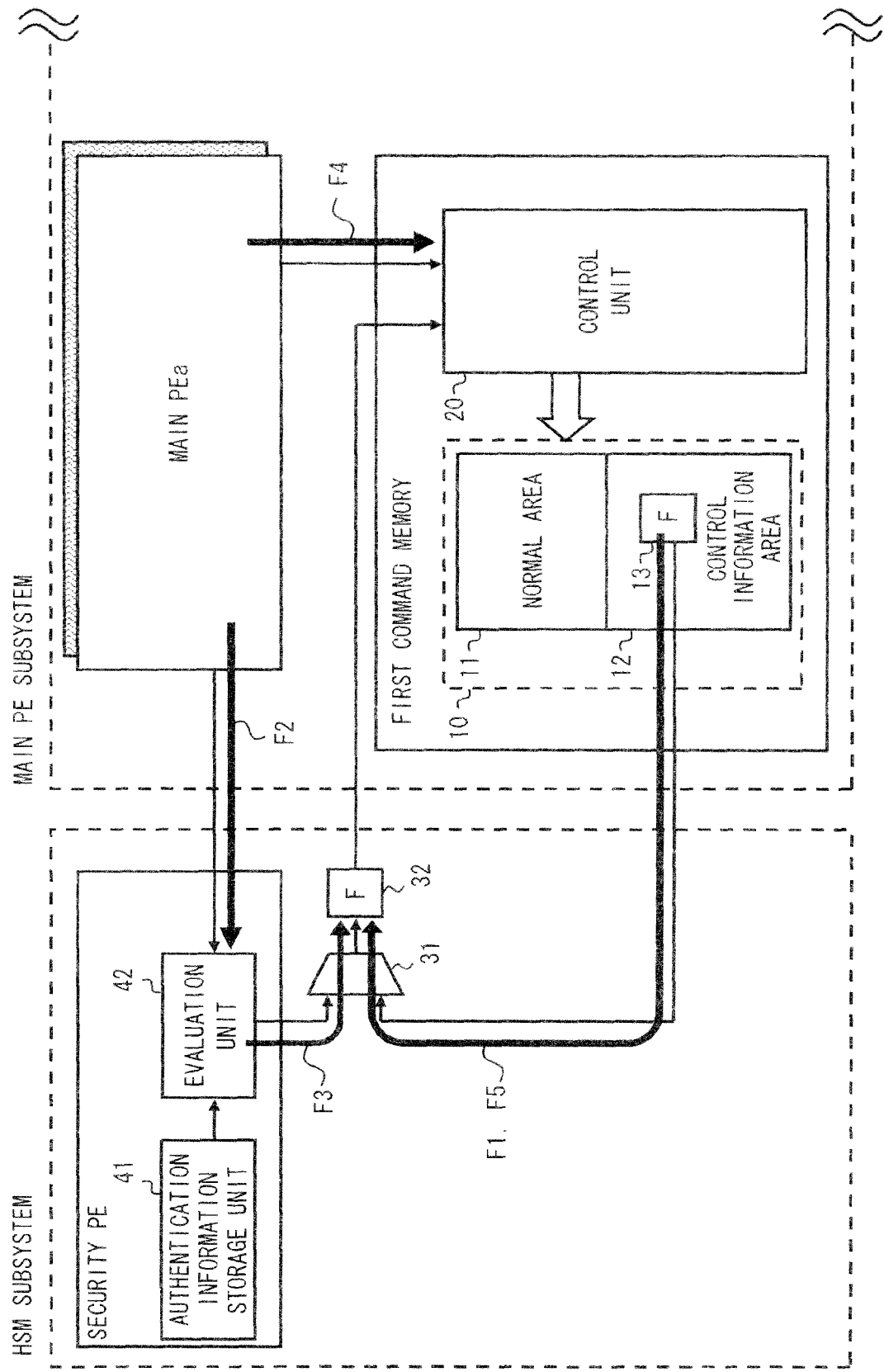
FIG. 5 is a diagram for explaining an operation of the processor system according to the first embodiment of the present invention.

Next, an operation of the processor system according to this embodiment is explained using FIGS. 4 and 5. FIG. 4 is a flowchart showing the operation of the processor system shown in FIG. 2. FIG. 5 is a diagram for explaining a flow of the operation of the processor system shown in FIG. 2.

First, in the initial state at the time of product shipment, for example, the access prohibit flag 13 is set to the allow side, and the access prohibit flag copy register 32 is also set to the allow side (step S100 of FIG. 4). That is, it is possible to write the program to the storage unit 10 at the time of product shipment.

After writing of the program to the storage unit 10 and the like is completed, the access prohibit flag 13 is set to the prohibit side (step S101 of FIG. 4).

After that, when the reset signal RST is cancelled (step S102 of FIG. 4), the value of the access prohibit flag 13 is transferred to the access prohibit flag copy register 32 (step S103 of FIG. 4 and F1 of FIG. 5). Then, the access prohibit flag copy register 32 is rewritten to the prohibit side. As a result, writing of the program and the like cannot be performed to the storage unit 10.

After that, in an attempt to write the program to the storage unit 10, for example, the main PEa requests the security PE to rewrite the access prohibit flag copy register 32 from the prohibit side to the allow side (step S104 of FIG. 4 and F2 of FIG. 5).

Upon receipt of the "request for rewriting the access prohibit flag copy register 32" issued from the main PEa, the security PE firstly evaluates the validity of the request (step SIPS of FIG. 4). When the security PE evaluates that the request is valid (YES in step S105 of FIG. 4), the security PE outputs the fixed signal (H level, for example) corresponding to the request. Then, the access prohibit flag copy register 32 is rewritten from the prohibit side to the allow side (step S106 of FIG. 4 and F3 of FIG. 5). As a result, writing of the program to the storage unit 10 and the like becomes temporarily possible.

Note that when the security PE evaluates that the request from the main PEa is invalid (NO in step S105 of FIG. 4), the access prohibit flag copy register 32 is not rewritten (step S111 of FIG. 4). That is, the access prohibit flag copy register 32 remains to be the prohibit side. Therefore, writing of the program and the like cannot be performed to the storage unit 10.

Upon completion of writing the program to the storage unit 10 and the like in response to the request from the main PEa (F4 of FIG. 5), the main PEa requests the security PE to rewrite the access prohibit flag copy register 32 from the allow side to the prohibit side (step S107 of FIG. 4). In this case, the security PE outputs the fixed signal (L, level, for example). Then, the access prohibit flag copy register 32 is rewritten from the allow side to the prohibit side (step S100 of FIG. 4). As a result, writing of the program and the like cannot be performed to the storage unit 10.

After that, upon initialization by the reset signal RST (step S109), the value of the access prohibit flag 13 that has already been set to the prohibit side is transferred to the access prohibit flag copy register 32 (step S110 of FIG. 4 and F5 of FIG. 5). Then, the access prohibit flag copy register 32 is rewritten from the allow side to the prohibit side. That is, the access prohibit flag copy register 32 can be rewritten to the prohibit side for sure even when the access prohibit flag copy register 32 cannot be rewritten to the prohibit side for some reason.

As described above, the processor system according to this embodiment includes the security PE that evaluates the validity of the authentication information issued together with the access request to the storage unit 10, the access prohibit flag copy register 32 that stores the fixed value corresponding to the evaluation result by the security PE when the access prohibit flag 13 is set to the prohibit side, and the access control circuit 21 that controls whether or not to allow the access from the main PEa to the storage unit 10 based on the output value from the access prohibit flag copy register 32. Then, in the processor system according to this embodiment, even when the access prohibit flag 13 indicates the prohibition of the access to the storage unit 10, it is possible for a person with knowledge of the authentication information to rewrite the access prohibit flag copy register 32 so as to access the storage unit 10. That is, the processor system according to this embodiment can flexibly control the access to the storage unit 10 even after the access prohibit flag 13 indicates the prohibition of the access to the storage unit 10.

Therefore, even after the access prohibit flag 13 is set to the prohibit side in order to protect the program stored to the storage unit 10 from a malicious third party, the manufacturer and the like with knowledge of the authentication information can rewrite the access prohibit flag copy register 32 so as to access the storage unit 10. It is thus possible to update the program in the market.

Further, in the processor system according to this embodiment, the security PE that is different from the main PEa evaluates the validity of the authentication information. Accordingly, the processor system according to this embodiment can evaluate the validity of the authentication information (validity of the request for rewriting the copy register) while maintaining high security level without being influenced by vulnerability of the main PEa. Namely, the access prohibit flag copy register 32 can be rewritten while maintaining high security level.

Furthermore, in the processor system according to this embodiment, the value of the access prohibit flag 13 is transferred to the access prohibit flag copy register 32 upon cancellation of the reset signal RST. Then, the access prohibit flag copy register 32 is set to the prohibit side for sure at every initialization by the reset signal RST even when the access prohibit flag copy register 32 is set to the allow side in response to the request from the main PEa. This enables limitation of the accessible period to the storage unit 10 to a certain period, thereby preventing unauthorized access.

Note that when the access prohibit flag 13 is set to the allow side, it is obvious that the access prohibit flag copy register 32 is also set to the allow side, thus allowing the access to the storage unit 10 without requiring to evaluate the validity of the authentication information. That is, when the access prohibit flag 13 is set to the allow side, it is possible to access the storage unit 10 without taking time to evaluate the validity of the authentication information.

Figure 6:
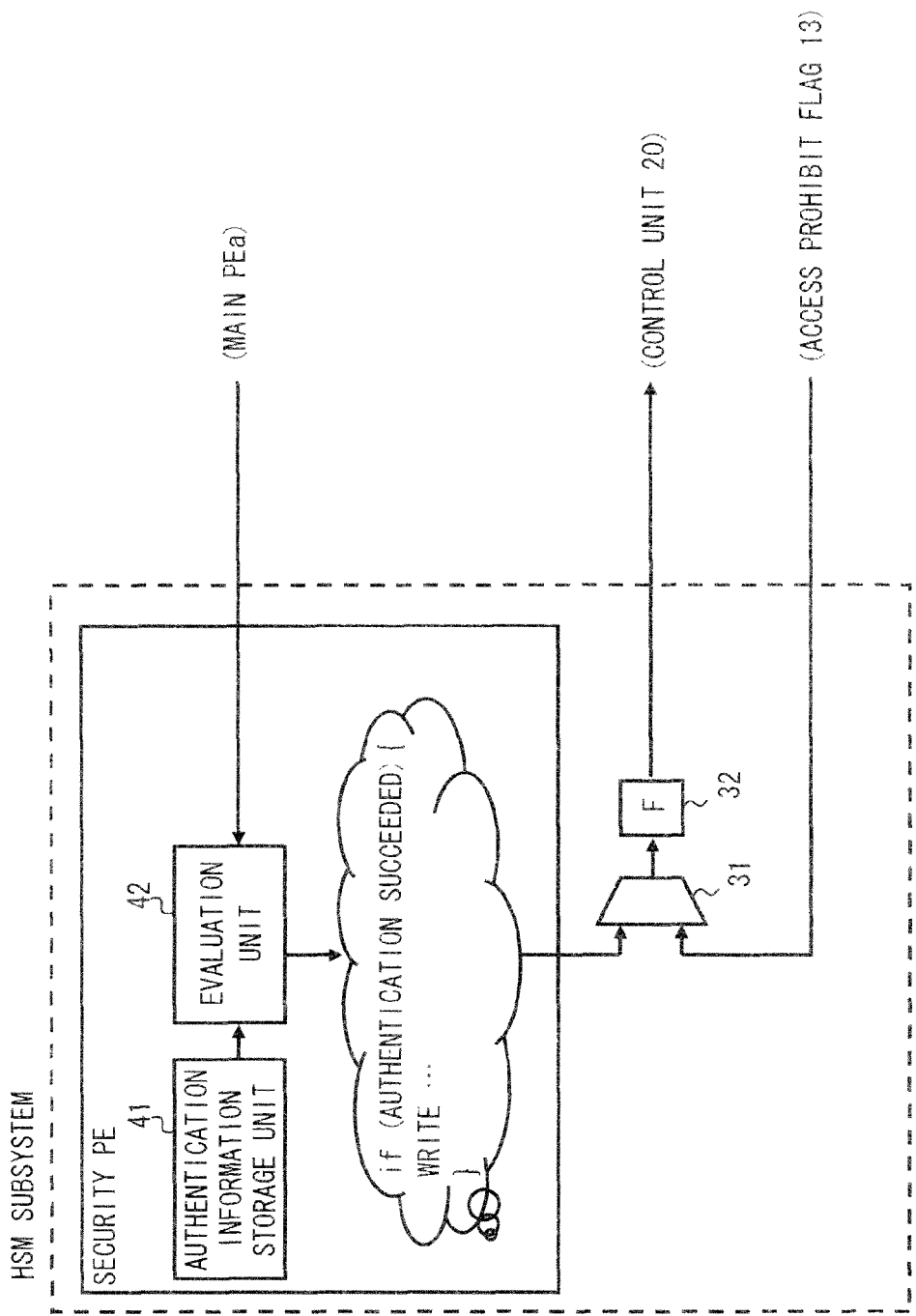
FIG. 6 is a block diagram showing a modification of the processor system according to the first embodiment of the present invention.

Note that although this embodiment explained an example in which the selector circuit 31 is provided, it is not limited to this. For example, as shown in FIG. 6, the part of the selector circuit 31 can be realized by software.

Second Embodiment

Figure 7:
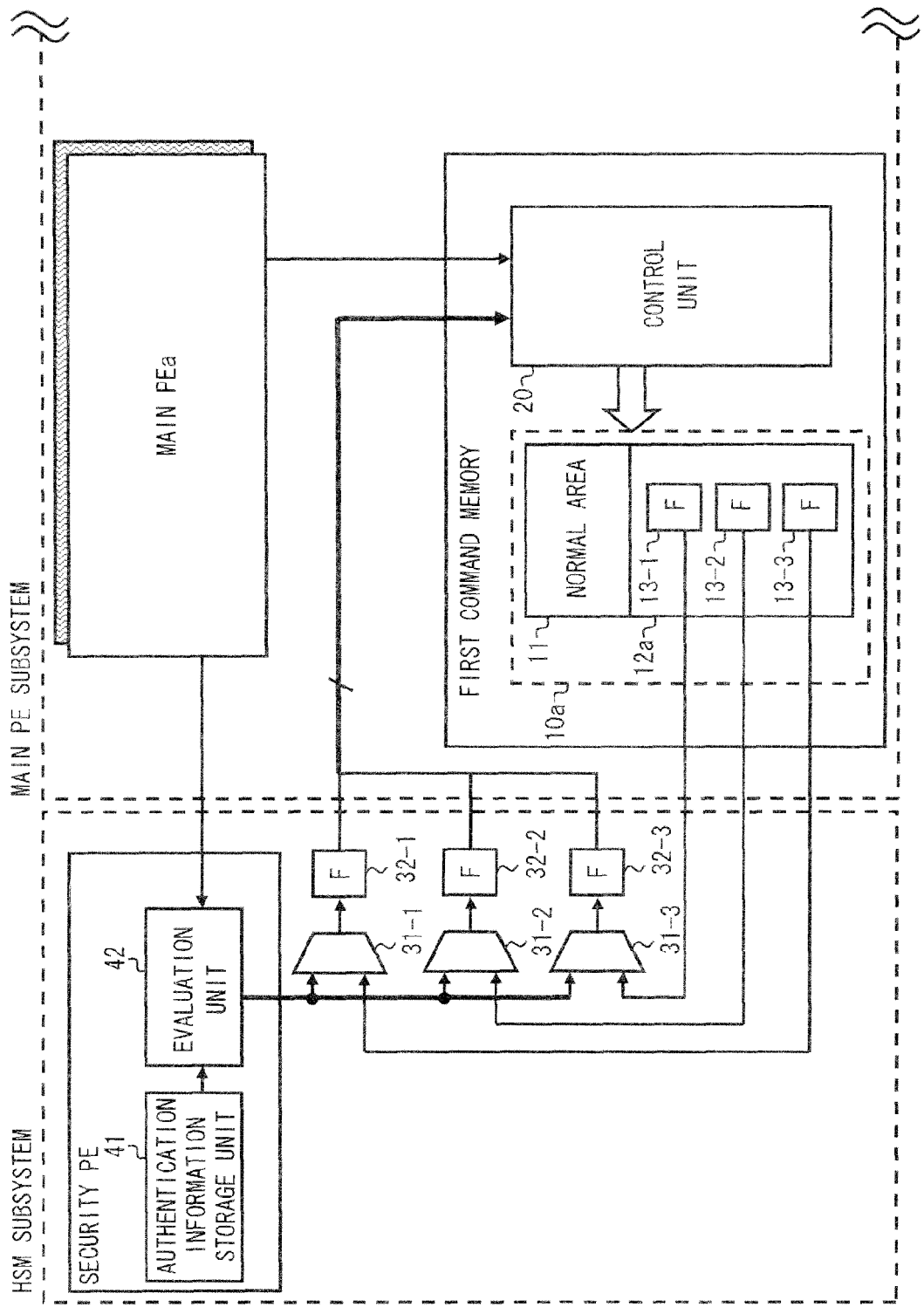
FIG. 7 is a block diagram showing a processor system according to a second embodiment of the present invention.

FIG. 7 is a block diagram showing a processor system according to a second embodiment of the present invention. A difference from the processor system according to the first embodiment is that the processor system according to this embodiment includes a plurality of access prohibit flags 13-1 to 13-3 in a control information area 12a, a plurality of selector circuits 31-1 to 31-3, and a plurality of access prohibit flag copy registers 32-1 to 32-3 in the HSM subsystem.

The access prohibit flag 13-1 sets whether or not to allow writing, reading, and erasing the program in the normal area 11. The access prohibit flag 13-2 sets whether or not to allow writing, reading, and erasing the program in the control information area 12a. The access prohibit flag 13-3 sets whether or not to allow writing, reading, and erasing the program in another memory (not shown).

The access prohibit flag copy registers 32-1 to 32-3 and the plurality of selector circuits 31-1 to 31-3 are provided corresponding to the access prohibit flags 13-1 to 13-3, respectively. Since each operation is the same as the operation of the access prohibit flag copy register 32 and the selector circuit 31 explained in the first embodiment, the explanation shall not be provided here.

As described above, the processor system according to this embodiment includes the plurality of access prohibit flags and the corresponding plurality of access prohibit flag copy registers, thereby allowing individual access control to the storage areas.

Although this embodiment explained the case as an example in which three each of the access prohibit flags and access prohibit flag copy registers are provided, it is not limited to this but the number of the access prohibit flags and access prohibit flag copy registers can be changed to any number corresponding to the number of storage areas to be access controlled.

Third Embodiment

Figure 8A:
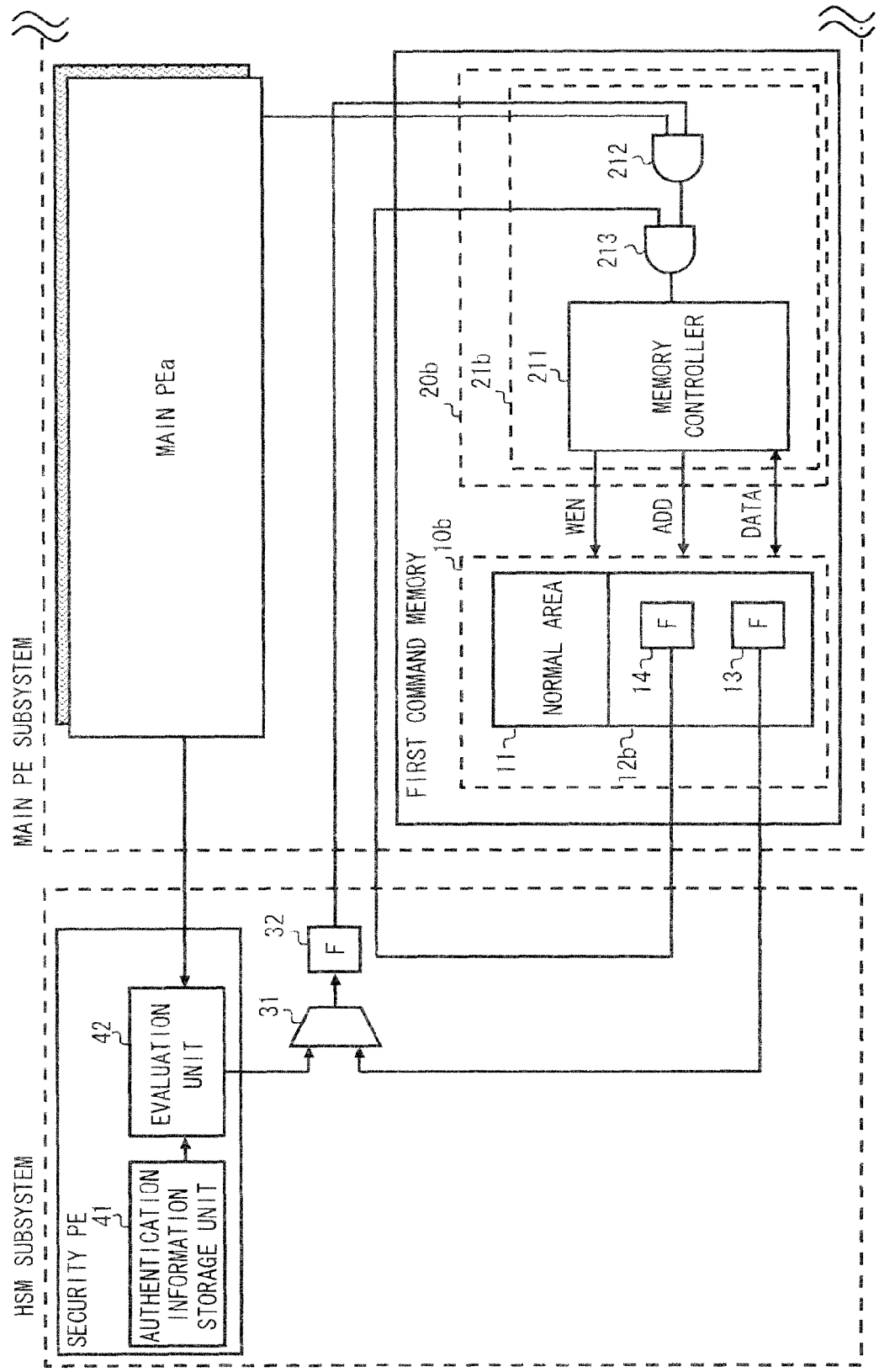
FIG. 8A is a block diagram showing a processor system according to a third embodiment of the present invention.

FIG. 8A is a block diagram showing a processor system according to a third embodiment of the present invention. A difference from the processor system according to the first embodiment is that the processor system of this embodiment further includes a lock flag 14 in a control information area 12b and a gating circuit 213 in an access control circuit 21b. Note that this embodiment explains the case an example in which the gating circuit 213 is an AND circuit provided for each bit.

The lock flag 14 sets whether or not to prohibit writing, reading, and erasing the program in a storage unit 10b permanently. When the lock flag 14 is set to the prohibit side, regardless the output value from the access prohibit flag copy register 32, writing, reading, and erasing the program in the storage unit 10b is prohibited. On the other hand, when the lock flag 14 is set to the allow side, it depends on the output value from the access prohibit flag copy register 32 whether or not writing, reading, and erasing the program in the storage unit 10b is allowed. That is, when the lock flag 14 is set to the allow side, the processor system of this embodiment operates in a similar manner to the first embodiment.

Here, the lock flag 14 is formed in the control information area 12b such that once the lock flag 14 is set to the prohibit side, the lock flag 14 can never return to the allow side. Therefore, when the lock flag 14 is set to the prohibit side, writing, reading, and erasing the program in the storage unit 10b is prohibited permanently.

More specifically, in the access control circuit 21b, the gating circuit 213 controls whether or not to output an output signal from the gating circuit 212 to the memory controller 211 based on a value of the lock flag 14. Hereinafter, the case is explained as an example in which when the access prohibit flag 13 is the L level, the access prohibit flag 13 is set to the prohibit side, whereas when the access prohibit flag 13 is the H level, the access prohibit flag 13 is set to the allow side.

For example, when the value of the lock flag 14 is the allow side (H level), the gating circuit 213 outputs the output signal from the gating circuit 212 as it is to the memory controller 211. That is, when the value of the lock flag 14 is the allow side (H level), the access control circuit 21b operates in a similar manner to the access control circuit 21 shown in FIG. 3A.

On the other hand, when the value of the lock flag 14 is the prohibit side (L level), the gating circuit 213 does not output the output signal from the gating circuit 212 to the memory controller 211. In this case, the gating circuit 213 outputs the fixed signal of L level to the memory controller 211, for example. As described above, when the value of the lock flag 14 is the prohibit side (L level), the access control circuit 21*b* does not execute the processing corresponding to the request from the main PEa regardless of the output value from the access prohibit flag copy register 32.

Accordingly, the processor system according to this embodiment can further improve the advantage of preventing unauthorized access as the access to the storage unit 10 can be completely prohibited in addition to achieving the similar advantage to the first embodiment.

Note that the access control circuit 21*b* is not limited to the configuration shown in FIG. 8A. For example, the access control circuit 21*b* can be changed to a configuration shown in FIG. 8B as an example. The configuration and an operation of the access control circuit 21*b* shown in FIG. 8B are explained below.

Figure 8B:
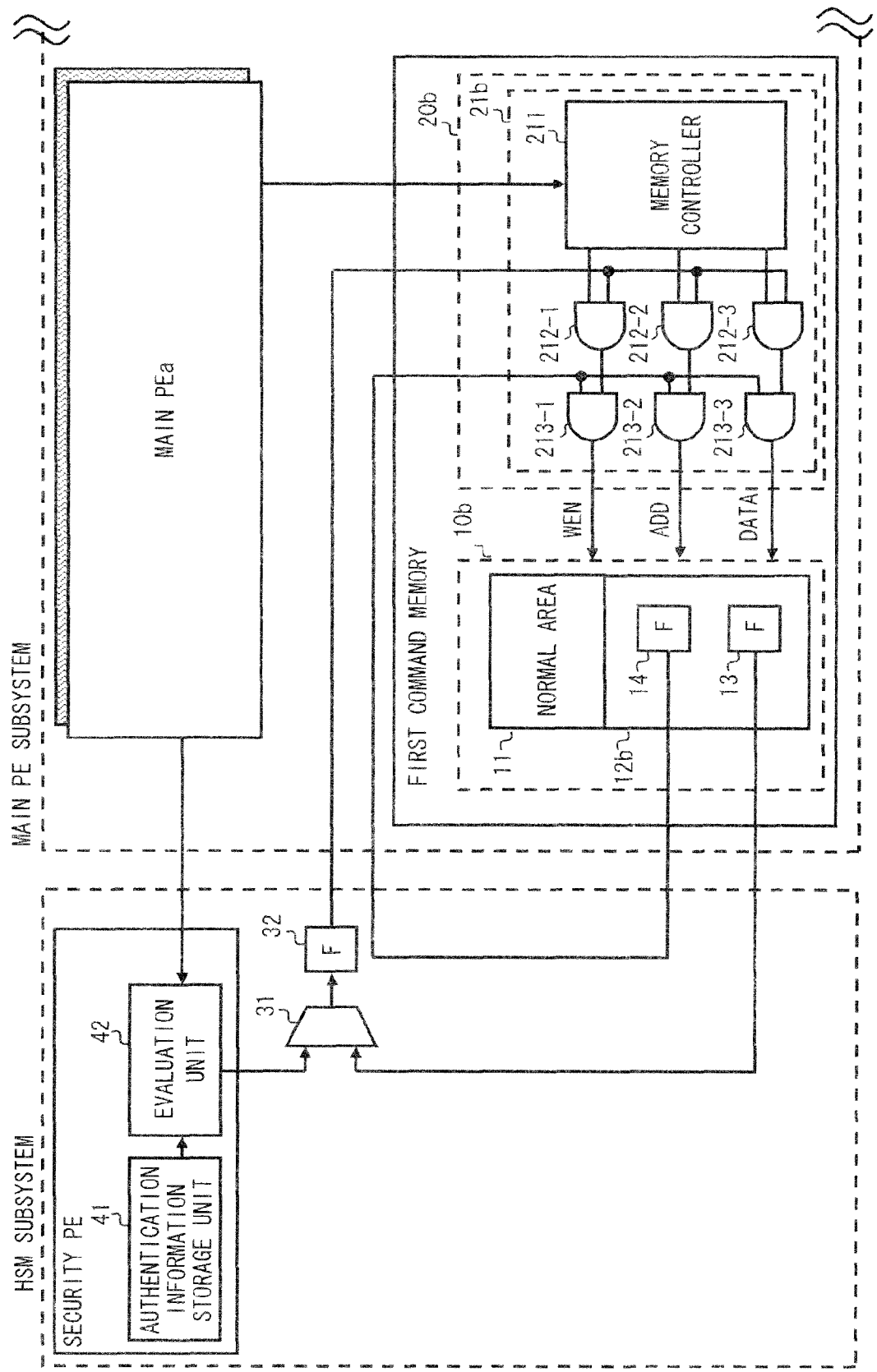
FIG. 8B is a block diagram showing the processor system according to the third embodiment of the present invention.
Figure 9:
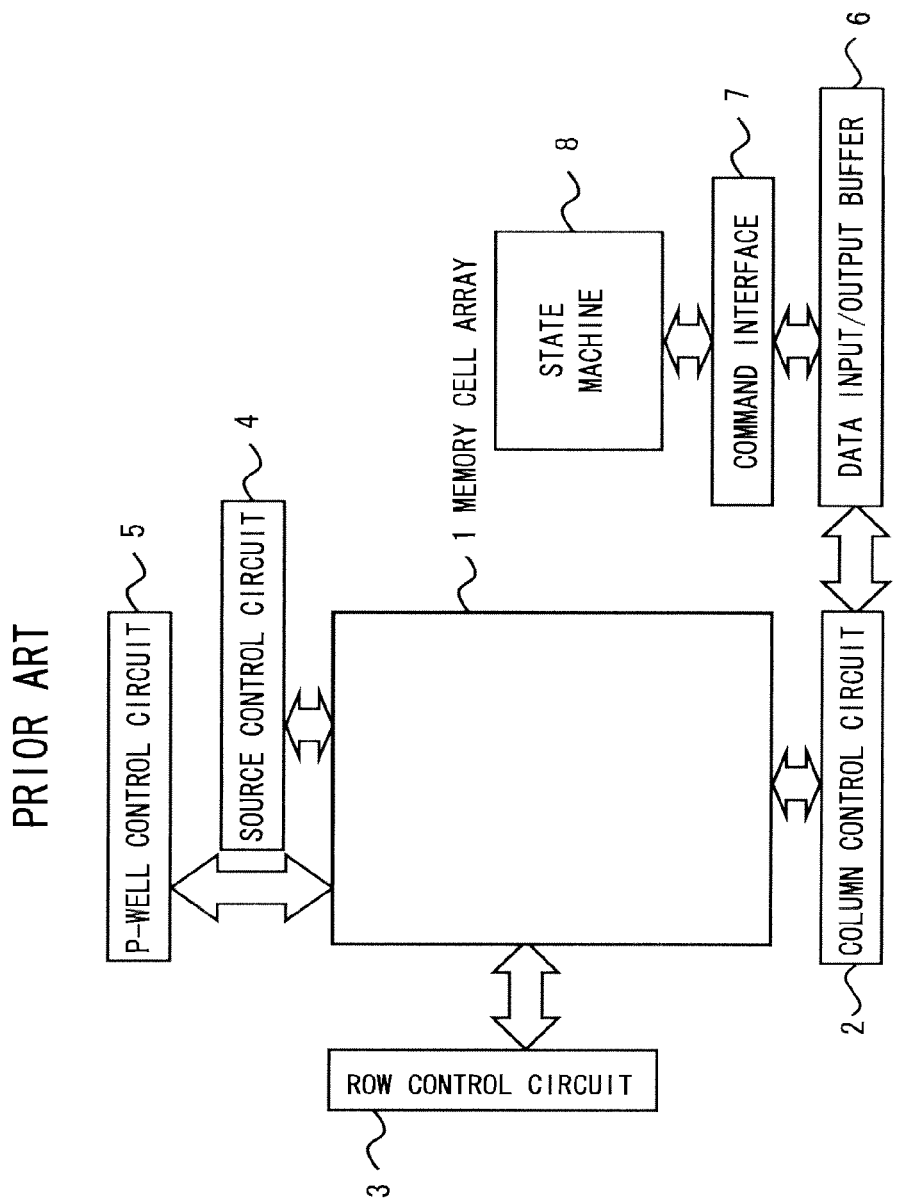
FIG. 9 is a block diagram showing a non-volatile semiconductor storage device according to a related art.

The access control circuit 21*b* shown in FIG. 8B further includes gating circuits 213-1 to 213-3 in addition to the access control circuit 21 shown in FIG. 3B. Note that this embodiment explains the case as an example in which the gating circuits 213-1 to 213-3 are AND circuits provided for each bit.

More specifically, in the access control circuit 21*b*, the gating circuits 213-1 to 213-3 control whether or not to output output signals from the gating circuits 212-1 to 212-3 to the storage unit 10*b*, respectively, based on the value of the lock flag 14. Hereinafter, the case is explained as an example in which when the access prohibit flag 13 is the L level, the access prohibit flag 13 is set to the prohibit side, whereas when the access prohibit flag 13 is H level, the access prohibit set to the allow side.

For example, when the value of the lock flag 14 is the allow side (H level), the gating circuits 213-1 to 213-3 output the output signals from the gating circuits 212-1 to 212-3 as they are to the storage unit 10*b*. That is, when the value of the lock flag 14 is the allow side (H level), the access control circuit 21*b* operates in a similar manner to the access control circuit 21 shown in FIG. 3B.

On the other hand, when the lock flag 14 is the prohibit side (L level), the gating circuits 213-1 to 213-3 do not output the output signals from the gating circuits 212-1 to 212-3 to the storage unit 10*b*. In this case, all of the gating circuits 213-1 to 213-3 output the fixed signal of L level to the storage unit 10*b*, for example. As described above, when the value of the lock flag 14 is the L level, the access control circuit 21*b* does not execute the processing corresponding to the request from the main PEa regardless of the output value from the access prohibit flag copy register 32.

Note that the present invention is not limited to the above first to third embodiments but can be changed within the scope and sprit of the present invention. The above first to third embodiments explained the case as an example in which the access control can be possible to any of the request for writing, reading, and erasing the program, however it is not limited to this. The configuration can be changed to a circuit configuration that can be access controlled for at least one of writing, reading, and erasing request.

Moreover, the above first to third embodiments explained the case as an example in which the gating circuits 212-1 to 212-1 and 213-1 to 213-3 are AND circuits provided for each bit, however it is not limited to this and the configuration can be changed to a circuit configuration achieving the similar advantages as appropriate. Therefore, the gating circuit may have a common circuit configuration composed of, for example, a latch circuit and an AND circuit.

Further, although the first to third embodiments explained the case as an example in which the value of the access prohibit flag 13 and the output value from the access prohibit flag copy register 32 are one bit, it is not limited to this. The value of the access prohibit flag 13 and the output value from the access prohibit flag copy register 32 may both be composed of a plurality of bits. Alternatively, a plurality of access prohibit flags 13 may be provided, and it may be determined whether to allow or prohibit access by the majority value of the plurality of access prohibit flags 13. Similarly, the plurality of access prohibit flag copy registers 32 may be provided, and it may be determined whether to allow or prohibit the access to the storage unit 10 by the majority output value of the plurality of access prohibit flag copy register 32. That is, it may be the configuration including multiplexed access prohibit flags 13 and access prohibit flag copy registers 32.

Note that as explained in the first to third embodiments, once the access prohibit flag 13 is set to the prohibit side, the access prohibit flag 13 can never return to the prohibit side. This is because that even with an authentication system, it is not preferable to allow free changes of the control information area 12 which makes up the basis of security. Moreover, when the normal area 11 and the control information area 12 are integrally configured and accessible via a single port, it is not possible to simultaneously read the value of the access prohibit flag 13 and access the normal area 11. It is thus more efficient to rewrite the value of the access prohibit flag copy register 32 that stores the value of the access prohibit flag 13.

REFERENCE SIGNS LIST

10, 10*a*, and 10*b* STORAGE UNIT
11 NORMAL AREA
12, 12*a*, and 12*b* CONTROL INFORMATION AREA
13 ACCESS PROHIBIT FLAG
13-1 to 13-3 ACCESS PROHIBIT FLAG
14 LOCK FLAG
20 and 20*b* CONTROL UNIT
21 and 21*b* ACCESS CONTROL CIRCUIT
22 RESET PROCESSING CIRCUIT
23 RESET GENERATION CIRCUIT
31 SELECTOR CIRCUIT
31-1 to 31-3 SELECTOR CIRCUIT
32 ACCESS PROHIBIT FLAG COPY REGISTER
32-1 to 32-3 ACCESS PROHIBIT FLAG COPY REGISTER
41 AUTHENTICATION INFORMATION STORAGE UNIT
42 EVALUATION UNIT
211 MEMORY CONTROLLER
212 GATING CIRCUIT
212-1 to 212-3 GATING CIRCUIT
213 GATING CIRCUIT
213-1 to 213-3 GATING CIRCUIT

The invention claimed is:

1. A processor system comprising:
a first storage unit that is composed of a plurality of electrically rewritable non-volatile memory cells;
a second storage unit that stores an access prohibit flag, the access prohibit flag being capable of SW itching value from a first value to a second value;
a first processor that issues an access request to the first storage unit and authentication information corresponding to the access request;

a second processor that evaluates whether or not the authentication information issued from the first processor is valid;

a copy register that stores a value corresponding to the first value when a value of the access prohibit flag is the first value and stores a value corresponding to an evaluation result by the second processor when the value of the access prohibit flag is the second value; and an access control circuit that controls whether or not to allow access from the first processor to the first storage unit based on the value stored to the copy register.

2. The processor system according to claim 1, wherein the access control circuit, when the value stored to the copy register is the value corresponding to the first value, allows the access to the first storage unit and, when the value stored to the copy register is a value corresponding to the second value, prohibits the access to the first storage unit.

3. The processor system according to claim 1, wherein the access prohibit flag is stored to the second storage unit so as not to be switched from the second value to the first value.

4. The processor system according to claim 1, wherein the second processor comprises:

an authentication information storage unit that stores predetermined authentication information; and an evaluation unit that compares the authentication information stored to the authentication information storage unit and the authentication information issued from the first processor and outputs the evaluation result.

5. The processor system according to claim 1, further comprising:

a plurality of the first storage units;

the second storage unit that stores a plurality of the access prohibit flags; and a plurality of the copy registers corresponding to the plurality of access prohibit flags, wherein the access control circuit controls whether or not to allow the access from the first processor to the corresponding first storage unit based on the value stored to the corresponding copy register.

6. The processor system according to claim 1, wherein the second storage unit further stores a lock flag capable of switching value from the first value to the second value, and the access control circuit controls whether or the access from the first processor to the first storage unit based on the value stored to the copy register and a value of the lock flag.

7. The processor system according to claim 6, wherein the access control circuit, when the value of the lock flag is the value corresponding to the second value, prohibits the access to the first storage unit regardless of the value stored to the copy register.

8. The processor system according to claim 6, wherein the lock flag is stored to the second storage unit so as not to be switched from the second value to the first value.

9. The processor system according to claim 1, wherein the second storage unit is formed in the first storage unit.

10. The processor system according to claim 1, further comprising a reset processing circuit that stores, upon initialization by a reset signal, the value of the access prohibit flag to the copy register regardless of the evaluation result.

11. The processor system according to claim 10, wherein the reset signal is supplied from outside.

12. The processor system according to claim 10, wherein the reset signal is a power-on reset signal.

13. A method of controlling a processor system comprising:

issuing, from a first processor an access request to a first storage unit and authentication information corresponding to the access request;

evaluating, by a second processor, whether or not the authentication information issued from the first processor is valid;

storing, when a value of an access prohibit flag is a first value, a value corresponding to a first value to a copy register, the access prohibit flag being capable of SW itching value front the first value to a second value;

storing, when the value of the access prohibit flag is the second value, a value corresponding to an evaluation result by the second processor to the copy register; and controlling whether or not to allow access from the first processor to the first storage unit based on the value stored to the copy register.

14. The method according to claim 13, further comprising allowing, when the value stored to the copy register is the value corresponding to the first value, the access to the first storage unit, and when the value stored to the copy register is a value corresponding to the second value, prohibiting the access to the first storage unit.

\* \* \* \* \*